Oct. 25, 1955

G. C. GILL 2,721,789

HYDROGEN GENERATOR

Filed Sept. 27, 1952

INVENTOR.
GERALD C. GILL
BY Kenway, Jenney, Witter
& Hildreth,
ATTORNEYS

Oct. 25, 1955　　　　G. C. GILL　　　　2,721,789
HYDROGEN GENERATOR
Filed Sept. 27, 1952　　　　　　　　3 Sheets-Sheet 3

INVENTOR.
GERALD C. GILL
BY Kenway, Jenney, Witter
& Hildreth
ATTORNEYS

United States Patent Office 2,721,789
Patented Oct. 25, 1955

2,721,789

HYDROGEN GENERATOR

Gerald C. Gill, Round Hill Field Station,
South Dartmouth, Mass.

Application September 27, 1952, Serial No. 311,863

3 Claims. (Cl. 23—282)

The present invention relates to hydrogen generators, and more particularly to apparatus suitable for generating hydrogen chemically at low pressures for inflating meteorological balloons.

Weather stations have for many years employed hydrogen or helium to fill radiosonde balloons for lifting measuring instruments to the upper atmosphere. In many localities the supply of helium is inadequate, and the consequent necessity of using hydrogen has created the need for a safe, dependable and economical source therefor.

Part of the difficulty in supplying this need has been caused by the remoteness of some of these stations from industrial centers where hydrogen can be generated in large quantities. Thus, in preference to shipment in high pressure cylinders over long distances, it is economically desirable to use a locally-installed generator suitable for the needs of a single installation.

The temperatures at some weather stations, particularly the more remote ones, have given rise to further difficulties. At some stations the ambient temperature varies between extremes as low as −50° F. and as high as +100° F. Heretofore, these variable conditions have had considerable effect, both upon the operating characteristics and the efficiency of locally-installed chemical-type hydrogen generators.

Further complications arise from the nature of hydrogen itself. When mixed with the air it creates an extremely serious hazard of explosion and fire, to counteract which the most extreme measures of precaution must be taken. For protection of personnel and equipment, the generator is invariably installed in a separate building, perhaps one hundred feet or more from any other building. Moreover, in cold weather the generator building is not heated by any means requiring a fire to be used within or adjacent to the building itself. Even remote heating by piped hot water is dangerous. Hydrogen leaking through the heating pipes to an adjacent building has been reported as the cause of at least one violent explosion. Thus, it is highly desirable to employ a type of hydrogen generator that can operate efficiently in an unheated building at the lowest ambient temperatures encountered.

The chemical generators commonly employed prior to the present invention were of the "high pressure" type. While having a very small capacity of, say, 1½ cubic feet, these generators produced the hydrogen and also served as high pressure hydrogen storage chambers. They commonly used a dry chemical charge displacing perhaps a third of the available capacity, which consisted of finely divided aluminum mixed with caustic soda. The charge reacted with a measured quantity of water to produce the hydrogen. Considerable heat was given off in the reaction, producing water temperatures of 500° F. to 600° F., and in some cases even higher. The small size of the generator provided little area for radiating the heat. Moreover, since the hydrogen was confined to perhaps one cubic foot of space, further heat was produced as the pressure in the generator rapidly increased. A charge in this type of generator commonly built up hydrogen pressures of 1300 p. s. i. and steam pressures of 2000 p. s. i. or higher. Numerous instances of rupture disks bursting under these extreme pressures, and occasional bursting of complete generators at pressures of 5000 p. s. i. have been reported, with the result that operation is hazardous, not only because of the physical danger from flying fragments, but also because of severe skin burns caused by the accompanying dispersion of particles of caustic soda.

Moreover, as the cubic capacity of meteorological balloons has increased from a maximum of about 70 cubic feet in 1941 to as much as 150 cubic feet at the present time, the use of these high pressure generators has become even more hazardous. Overcharging results in an increase in pressure corresponding, not only to the increase in the amount of hydrogen generated, but also to the diminution of the storage space caused by the increase in the displacement of the charge itself.

Accordingly, it is a principal object of the present invention to provide apparatus for generating hydrogen from the cheap chemicals heretofore used, but at such low pressures as to eliminate the danger of bursting.

Another important object is to provide a generator adapted to operate safely and efficiently in an unheated building over a range of ambient temperatures between approximately −50° F. and +100° F.

Another object is to provide a generator capable of filling a balloon of any capacity up to or beyond 150 cubic feet in not more than twenty minutes time.

A further object is to provide a generator capable of recharging successively without reduction of the rate of hydrogen generation, whereby successive charges may be introduced at intervals as close as twenty minutes apart.

In addition, because of the use of these generators at isolated stations, the necessity for a generator of simple construction, having no precision parts, permitting easy charging and cleaning, and requiring a minimum of maintenance, will be readily understood.

According to the present invention, I use a novel type of hydrogen generator capable of producing anywhere from 50 to 250 cubic feet of hydrogen per charge at extremely low pressures, from the reaction of water with a measured dry charge of finely divided aluminum (e. g., shot, saw cuttings, twist drill turnings) and flake caustic soda (sodium hydroxide).

The maximum pressure in the generator is as low as 8 p. s. i., and normal operating pressures are of the order of 2 p. s. i. or less. Thus, the danger of explosions and fires has been reduced to about one-tenth the danger in using the present high-pressure type of generator.

As hereinafter indicated, other chemical charges may also be used in case of emergency.

A feature of the invention includes a fire tube boiler type of construction by means of which the hydrogen evolved in the reaction is cooled by conduction through the tube walls to a body of coolant such as water, or, in cold weather, fuel oil or antifreeze solution. Water vapor or steam produced by the boiling of the water due to the heat of reaction is also condensed in the tubes and returns to the charge to enter into the reaction. As a result, it is possible to draw off relatively dry, cool hydrogen, having high lift efficiency.

Another feature is the direct connection of the generator with the balloon to be filled during the reaction. The generator is not used as a hydrogen storage chamber, to be bled off at some time after the start of the reaction when the pressure has reached a considerable value far in excess of that needed to fill the balloon.

Another feature resides in the simple and convenient means for flushing a used charge preparatory to introducing a new one.

Another feature, of particular utility in extremely cold weather, is a provision for vaporizing super-cooled water droplets that may be caried off with the hydrogen, which would otherwise interfere with the flow of hydrogen by adhering as ice or hoarfrost at an orifice or sharp bend in the take-off pipe. This feature also reduces the hazard of an electrostatic charge building up at the orifice or bend, and ultimately upon the balloon itself, due to the rapid passage of hydrogen through the orifice.

Still another feature resides in pressure equalizing means, whereby the pressure at the surface of the water reservoir is equalized with the pressure in the reaction chamber to insure a steady flow of reaction water and to prevent hydrogen from feeding back into the reservoir.

Other features of the invention relate to certain structural arrangements and relationships and to control features especially adapted to satisfy the above objects and others appearing hereinafter. These are more fully described in relation to the preferred embodiment herein described, and are more particularly defined in the claims.

Figure 1:
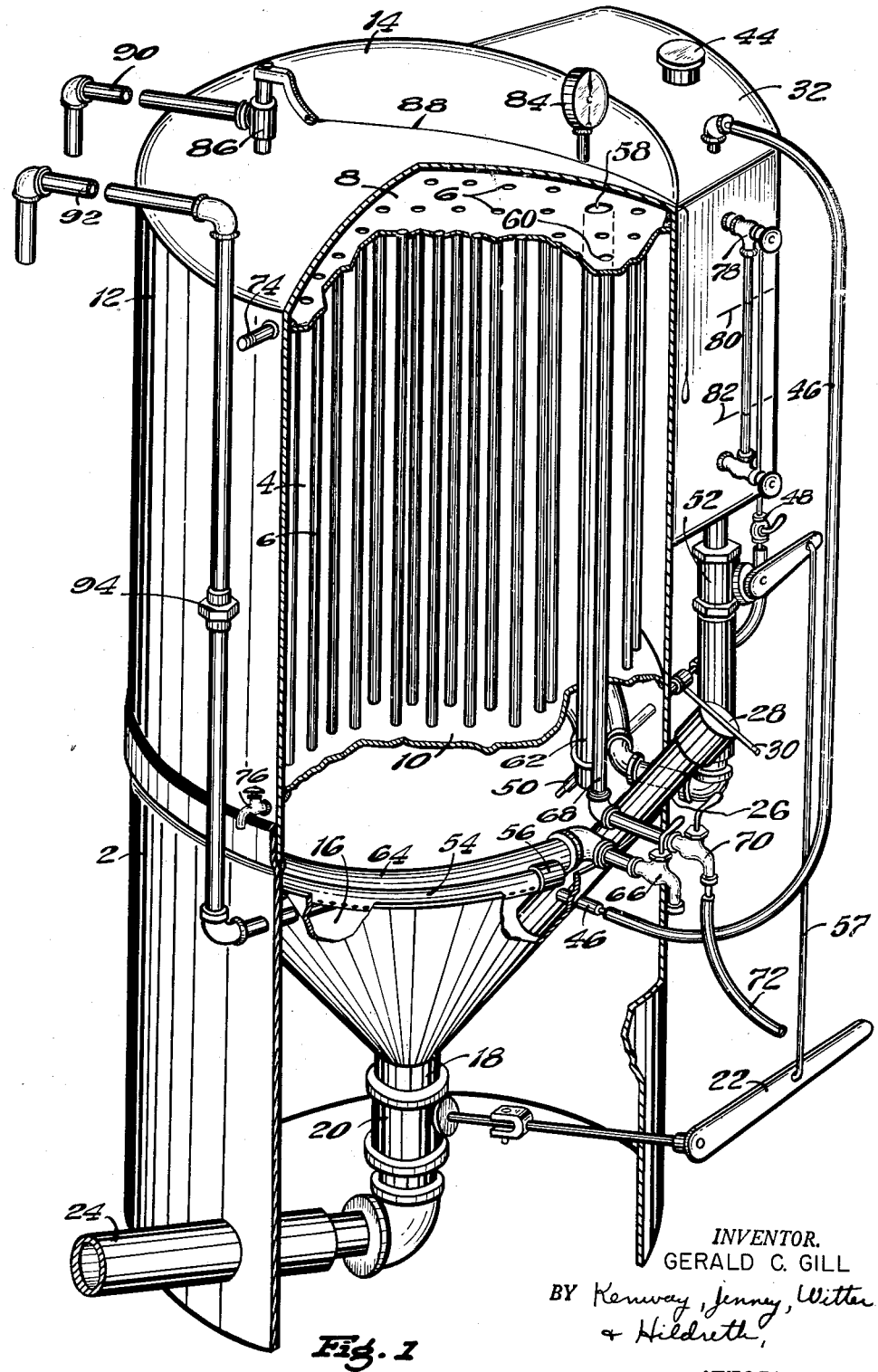
Fig. 1 is a pictorial view, partly in section, showing the general construction of the preferred embodiment.

Referring first to Fig. 1, the entire generator is supported upon a cylindrical sheet steel base 2. A cooling liquid chamber 4 is formed by welding hydrogen cooling tubes 6 at each end to header plates 8 and 10, then welding the header plates to a cylindrical sheet steel casing 12. At its base, the casing 12 is welded to the base 2. As shown, the casing 12 extends a very short distance above the upper header plate 8, and is welded along its edge to a convex or "dished" steel top plate 14.

A chemical reaction chamber 16 of sheet steel is formed in the shape of an inverted cone having an orifice at its downward pointing apex, to which is welded a short piece of straight pipe 18. At its upper rim the reaction chamber is welded to the base 2 in a position several inches below the lower header plate 10. This is to provide clearance for an annular shaped preheating manifold and a flushing pipe hereinafter to be described. To the pipe 18 is threaded a chemical residue outlet valve 20, operated by a handle 22, which communicates with a chemical residue discharge tube 24. The discharge tube preferably empties into a trough leading away to a chemical disposal pit.

As indicated above, the chemical charge preferably comprises sodium hydroxide and finely divided aluminum, ordinarily in the ratio of approximately 9 to 6 by weight. The reaction which follows upon the addition of water is well known, and may be expressed as follows: $2Al + 2NaOH + 2H_2O \rightarrow 2NaAlO_2 + 3H_2$. Under typical conditions 5 gallons of water would react with a charge of 9 pounds of sodium hydroxide and 6 pounds of aluminum to fill a balloon of roughly 125 cubic feet capacity. In an emergency, the generator would work satisfactorily with sodium hydroxide solution and ferro-silicon, or either of the more expensive chemicals of calcium hydride and lithium hydride, reacting with water. The charge is dumped into the chamber 16 through a chemical filling pipe 26 extending downward at an angle through the base 2 and over the upper rim of the reaction chamber. At its external end the filling pipe is threaded and provided with a chemical filling pipe cap 28 having welded thereto a handle or crank rod 30.

It will be observed that sheet steel and boiler pipe are used throughout in the construction of the generator, except for certain parts where lower heat capacity and lower thermal conductivity are desirable. This is made possible by the fact that sodium hydroxide solution does not corrode either iron or steel.

Figure 2:
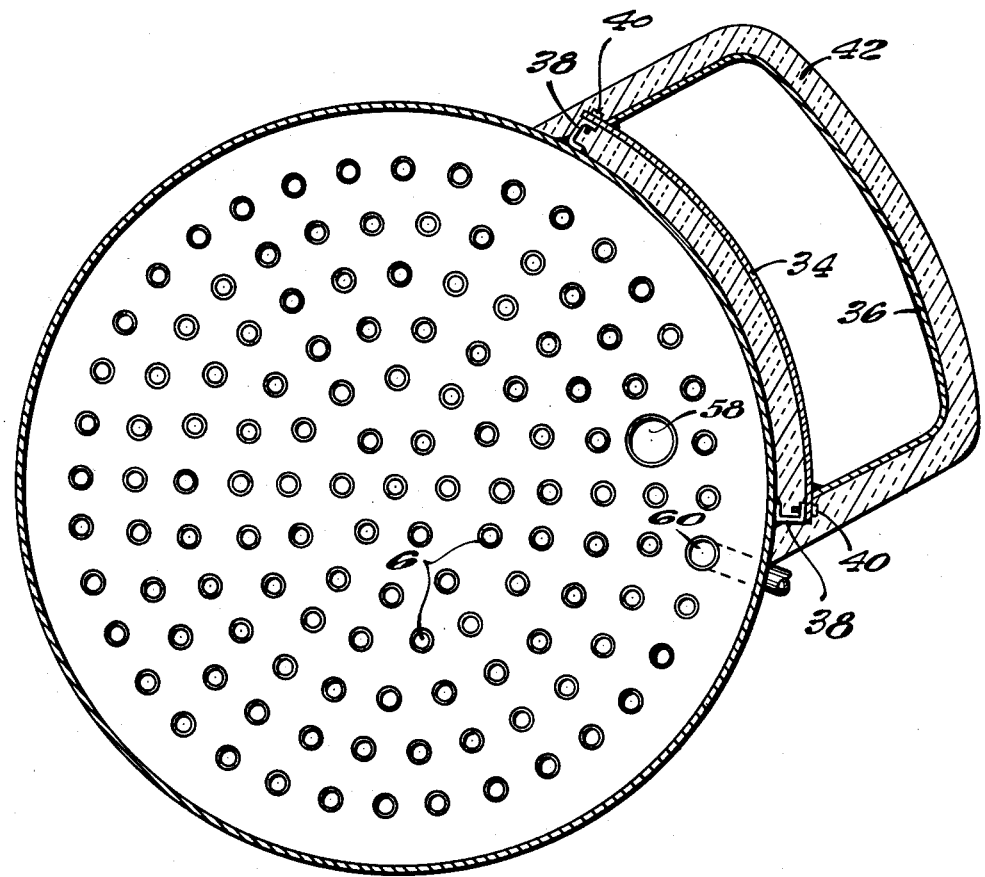
Fig. 2 is a plan view showing details of the header and water reservoir construction.
Figure 3:
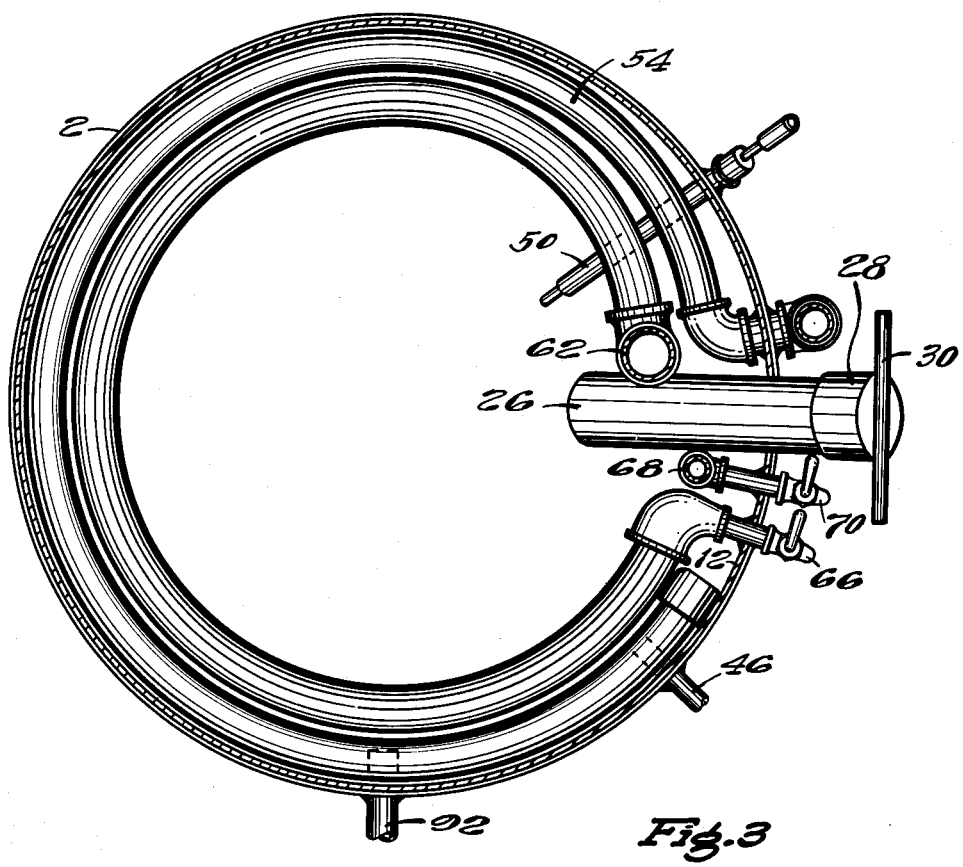
Fig. 3 is a plan view showing details of the take-off piping.

A water reservoir, from which is supplied both the reaction water and the water for flushing the chemical reaction chamber 16 after a charge is exhausted, is secured to the outside of the generator in the manner indicated in Fig. 2. The walls of the reservoir are formed of two pieces of sheet steel 34 and 36, welded together in such a manner that the piece 34 substantially conforms with the shape of the casing 12 and extends a short distance to each side beyond the piece 36. U-channels 38 are welded to the casing 12 and bolted to the piece 34 by bolts 40. The clearance thus provided between the water reservoir and the cooling liquid chamber provides a space which, in generators designed for operation in extremely cold climates, is filled with asbestos packing, fiberglass or other insulating material. Similarly, the entire external wall area of the reservoir is covered to form a layer of insulation 42. The function of the insulation is to retain enough heat in the water to prevent freezing in the valves or lines leading to the chemical reaction chamber.

Water is poured into the top of the reservoir 32 through a filling pipe having an air-tight cap 44, spring loaded to vent the reservoir at pressures in excess of 9 or 10 p. s. i. Also extending from the top of the reservoir 32 is a short section of pipe connected by a rubber pressure-equalizing tube 46 to the chemical reaction chamber 16 as shown in Fig. 1. The purpose of this tube is to equalize the pressures at the surface of the water in the reservoir and within the chemical reaction chamber, to insure a steady flow of reaction water to the charge and to prevent the flow of hydrogen back into the reservoir, as is hereinafter more fully explained.

The base of the water reservoir is provided with two fittings, each including hand-operated valves connected through rubber tubing to pipes within the generator. A reaction water valve 48 controls the admission of water through a short section of iron pipe 50 to the charge. A flushing water valve 52 communicates with an annular shaped flushing pipe 54 which extends around the rim of the reaction chamber 16 and is terminated with a cap 56. Spaced holes are drilled in the flushing pipe so as to cause the flushing water to flow uniformly down the walls of the reaction chamber when the valve 52 is opened.

A linkage arm 57 causes the flushing water valve 52 to open or close simultaneously with the opening or closing of the chemical residue outlet valve 20. By having the valves 20 and 52 open simultaneously I reduce the danger of excessive pressures occurring in the generator by reason of an inexperienced operator erroneously opening the flushing valve 52 instead of the reaction water valve 48 at the start of a reaction.

As shown in Fig. 2, the header plate 8 contains holes 58 and 60 adapted to receive two pipes, each of a larger diameter than the hydrogen cooling tubes 6. The plate 10 has similar holes. A pipe 62 extends downward to an elbow communicating with an annular shaped hydrogen preheating manifold 64 extending around the rim of the chemical reaction chamber alongside the flushing pipe 54. The end of the manifold 64 is connected through appropriate fittings to a warm hydrogen take-off valve 66. A pipe 68 is connected through an elbow and a short length of straight pipe directly to a cold hydrogen take-off valve 70. A balloon filling hydrogen hose 72 is adapted to be connected alternatively to either the warm hydrogen take-off valve 66 or the cold hydrogen take-off valve 70, according to the ambient weather conditions, as is hereinafter more fully explained. However, it is obvious that the hose 72 could be connected to both valves through a Y-connection or a mixing valve if this should prove desirable.

Thus, it may be seen that when water is admitted to the reaction chamber by opening the valve 48, the hydrogen evolved from the reaction moves upward through the hydrogen cooling tubes 6 to the space above the header plate 8, and thence either through the pipe 62 and manifold 64 or through the pipe 68, as the case may be, to the balloon filling hydrogen hose 72. If the hose 72 is connected to the take-off valve 66 the hydrogen is warmed by heat evolved in the reaction which passes through the walls of the manifold 64. The pipe 68 is arranged so that little heat is added to the hydrogen passing therethrough after it has passed through the cooling tubes 6.

The cooling liquid chamber 4 is filled through a filling pipe 74 and emptied through a faucet 76. The nature of the coolant depends upon the conditions of use. Thus, while water may be used during periods when freezing is not anticipated, anti-freeze solution or fuel oil are required for lower temperatures. The function of the coolant is to reduce the temperature of the hydrogen and to condense the steam or water vapor which rises with it due to the boiling off of the reaction water. The combined effect of the cooling of the hydrogen and of the direct connection of the space above the header plate 8 with the balloon to be filled is to keep the pressure of the hydrogen extremely low, that is, at an average of approximately 2 p. s. i., while preventing the temperature of the water in the reaction chamber from increasing any substantial amount above its boiling point.

A water gage 78 provides means for indicating the level of the water in the reservoir 32 so as to insure a proper quantity for the reaction and flushing operations. Thus, a line 80 marked on the side of the reservoir indicates the minimum level for starting the reaction of a standard charge, while a line 82 indicates the minimum level for the flushing of the chemical reaction chamber.

A pressure gage 84 is fitted into the top plate 14 for measuring the pressure of the hydrogen immediately above the header plate 8. A hydrogen pressure relief valve 86, also adapted for emergency hand operation by means of a cord 88, is connected through a pipe 90 to the outside of the building. The valve 86 is set to open at a pressure of approximately 8 p. s. i. so that if the pressure within the generator increases beyond this value, the hydrogen is automatically exhausted to the outside.

Figure 4:
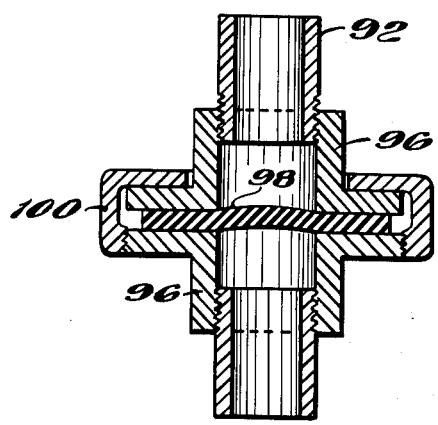
Fig. 4 is a sectional view showing details of the diaphragm safety valve.

As an added safety precaution, an additional exhaust pipe 92 communicates through a diaphragm safety valve 94 directly with the space immediately above the chemicals in the chemical reaction chamber 16. Details of construction of the valve 94 are shown in Fig. 4. Flanged tubular fittings 96 are threaded to the pipe 92 and faced so as to provide a means for clamping a circular piece of rubber 98, such as might be cut out of the inner tube of a tire. A clamping ring 100, formed so as to engage the flange of one fitting 96, and threaded to engage the other fitting, may be screwed down so as to hold the rubber firmly and to provide a gas-tight seal. The thickness of the rubber determines the pressure at which a rupture will occur to expel the gases in the chemical reaction chamber directly to the outside of the building. Thus, if for any reason the relief valve 86 should become stuck or frozen the safety valve 98 would still be in condition to prevent the building up of excessive pressures within the generator.

To reduce the hazards of electrostatic charges building up on parts of the generator, a heavy wire is connected to a convenient bare metal part of the generator and grounded.

It will be appreciated that subzero operating conditions create a considerable danger of water freezing in the generator. However, through the use of rubber tubing (as shown in Fig. 1) which has a low thermal capacity and low heat conductivity, as well as through careful selection of valves and downward sloping of water conductors, the problem of freezing during the reaction itself has been substantially eliminated, and complete drainage immediately thereafter is rendered possible.

The operation of the generator will next be described.

First, the chemical residue outlet valve 20 and the flushing water valve 52 are closed by operation of the handle 22 and linkage arm 57. Then the reaction water valve 48 is closed, and the airtight cap 44 removed. Eight gallons of water are poured into the water reservoir bringing the water in gage 78 up to the line 80. The reservoir is then sealed by replacing the airtight cap 44. In cold weather the water must be warm enough to prevent freezing before use.

The chemical filling pipe cap 28 is then removed and the charge poured into the chemical reaction chamber 16. The cap 28 is then screwed back onto the filling pipe.

The balloon filling hose 72 is next connected to the desired take-off valve 66 or 70. If the ambient temperature is above approximately zero Fahrenheit, the cold hydrogen take-off valve 70 is normally used, while if the temperature is lower the valve 66 is used. A balloon is tied to the other end of the hose 72. The take-off valve connected with the hose 72 is next opened, the other take-off valve being left closed.

Next, the reaction water valve 48 is opened about halfway. After a few seconds the reaction will start and the balloon will begin to inflate. The rate of the reaction is controlled by the valve 48. It will be found that after two or three minutes this valve can be opened fully and left open. If too much reaction water is applied near the start of the reaction the pressure may go up to 8 p. s. i. and blow hydrogen off through the pressure relief valve 86. The pressure gage 84 should be carefully watched, especially during the first few minutes of the reaction.

With a charge of chemicals sufficient to produce 120 cubic feet of hydrogen the reaction continues at an almost steady rate for about eight minutes, then rapidly falls off, being practically complete two minutes later.

When the balloon is inflated sufficiently, the hydrogen flow is stopped by first closing the take-off valve attached to the balloon filling hose 72, and then immediately depressing the handle 22. This opens the chemical residue outlet valve 20 and flushing water valve 52 before any additional pressure is built up within the generator. The boiling liquid residue rushes through the chemical residue outlet valve 20 and chemical discharge tube 24 into the chemical disposal pit outside. At the same time water gushes out of the holes in the annular shaped flushing pipe 54 to thoroughly rinse out any remaining residue from the inside walls of the chemical reaction chamber 16, chemical residue outlet valve 20 and chemical discharge tube 24. The cleaning of the generator being complete, the balloon may then be tied off.

The elapsed time for weighing out the chemicals, charging the generator, the reaction itself, flushing the generator and tying off the balloon is only about twenty minutes. Thus, if the first radiosonde release were unsuccessful, a second release could be made within twenty minutes.

The generator may be charged and recharged several times in rapid succession, provided the temperature of the coolant does not exceed about 150° F. Simple modifications, such as providing a running water intake at the faucet 76 and a hot water overflow at the filling pipe 74, will make the generator capable of continuous charging and recharging, hour after hour.

At all times during the reaction the valves 86 and 94 provide insurance against the building up of excessive pressures. However, if the operator does not desire to rely upon these devices he may relieve excessive pressures at any time during the inflation process by pulling the cord 88 to open the valve 86 manually, or if for any reason this valve proves inoperative the pressure may be relieved by opening the take-off valve 66 or 70 that is not in use. As a last resort the chemicals may be dumped by opening the chemical residue outlet valve 20.

It will be appreciated that the feeding of the reaction water depends upon the sum of the pressure at the surface of the water in the reservoir 32 and the water head resulting from the elevated position of the reservoir, and also upon the pressure within the reaction chamber itself. If the latter increases while the former remains unchanged the rate of water flow decreases and hydrogen may commence to bubble back into the reservoir. These effects are eliminated by the described arrangement, since the cap 44 is airtight below pressures of 9 to 10 p. s. i. and the pressure-equalizing tube 46 equalizes the pressure at the water surface with that in the reaction chamber. Hence, the effective feeding pressure is determined by the elevation of the reservoir above the reaction chamber irrespective of the changing pressures in the chamber. Pressures above 9 or 10 p. s. i. are excessive, and if the generator reaches these values the water reservoir furnishes an added path for the escape of hydrogen from the chamber.

As already noted, a certain amount of reaction water is boiled off due to the high heat of the reaction, and this is carried upwards through the cooling tubes 6 with the hydrogen. If the ambient temperature is moderate, a large percentage of this steam will be condensed in the cooling tubes 6 and will flow back into the reaction chamber 16. This will leave dry hydrogen which may be removed through the pipe 68 directly to the filling hose 72. However, if the ambient temperature is extremely low, a condition may arise wherein the moisture carried up with the hydrogen is super-cooled when it reaches the space above the header plate 8. If the valve 70 is used under these conditions, it will be found that super-cooled droplets will condense at the orifice 60 and may impede the flow of hydrogen to the balloon. In such a case, the pipe 62, which has a larger diameter than the pipe 68, is used. The hydrogen is conducted down through the pipe 62 and then through the manifold 64 to the hose 72. The heat of reaction passes through the walls of the manifold, raises the hydrogen temperature to about 120° F. above the coolant temperature, and vaporizes any water droplets that are present. This prevents the formation of ice or hoarfrost at any point in the take-off lines where the path is narrow and the above danger exists.

Another advantage of warming the hydrogen before it enters the balloon arises from the fact that the balloon is generally made of rubber, which stretches poorly if it is cold.

As already stated, the retention of a certain amount of water in the hydrogen also has the desirable effect of reducing the hazard of electrostatic charges building up in the apparatus and upon the balloon. It is well known that when a gas such as hydrogen passes through a small orifice or takes a sharp bend, it tends to charge up and to place a corresponding reversely-polarized charge on the parts forming the orifice. However, this tendency is substantially reduced by the presence of water vapor in the gas. Although the moisture increases the weight of the gas, the reduction in lift efficiency has been found to be small, being of the order of two percent or less in a typical instance.

It will be understood that the invention has been described in reference to a preferred embodiment, and that various modifications of structure and arrangement, as will suggest themselves to those skilled in the art, may be made without departing from the spirit or the scope of the invention.

Having thus described my invention, I claim:

1. Apparatus for generating hydrogen comprising, in combination, a reaction chamber having filling and flushing means for a charge and water to be reacted therewith, a coolant container situated above the chamber, an enclosure situated above the coolant container, said container having upper and lower header plates and a number of cooling tubes secured between said plates and connecting the chamber with said enclosure, and means to withdraw hydrogen from said enclosure including a substantially straight length of tubing extending from said enclosure to the chamber and a preheating manifold connected with said last-mentioned tubing, provided with an external hydrogen outlet and situated within the chamber in position to receive heat from the reaction.

2. Apparatus for generating hydrogen comprising, in combination, a reaction chamber having filling and flushing means for a charge and water to be reacted therewith, a coolant container situated above the chamber, an enclosure situated above the coolant container, said container having upper and lower header plates and a number of cooling tubes secured between said plates and connecting the chamber with said enclosure, and means to withdraw hydrogen from said enclosure including a length of tubing extending from said enclosure to the chamber and a preheating manifold connected with said last-mentioned tubing, provided with an external hydrogen outlet and situated within the chamber in position to receive heat from the reaction.

3. Apparatus for generating hydrogen comprising, in combination, a reaction chamber having filling and flushing means for a charge and water to be reacted therewith, a coolant container situated above the chamber, an enclosure situated above the coolant container, said container having upper and lower header plates and a number of cooling tubes secured between said plates and connecting the chamber with said enclosure, and means to withdraw hydrogen from said enclosure including a substantially straight length of tubing having a substantially larger diameter than the cooling tubes and extending from said enclosure to the chamber and a preheating manifold connected with said last-mentioned tubing, provided with an external hydrogen outlet and situated within the chamber in position to receive heat from the reaction.

References Cited in the file of this patent

UNITED STATES PATENTS

| Number | Name | Date |
|---|---|---|
| 676,791 | Einstein | June 18, 1901 |
| 1,422,030 | Carmichael | July 4, 1922 |
| 1,443,815 | De Cazen | Jan. 30, 1923 |
| 1,613,184 | Messer | Jan. 4, 1927 |
| 2,332,915 | Jaubert | Oct. 26, 1943 |
| 2,603,559 | Patterson | July 15, 1952 |

FOREIGN PATENTS

| 47,445 | Australia | Apr. 10, 1911 |